United States Patent [19]
Sells

[11] 3,963,919
[45] June 15, 1976

[54] MOTION RESPONSIVE DETECTOR APPARATUS

[75] Inventor: Fred E. Sells, Milwaukee, Wis.

[73] Assignee: National Controls Corporation, Addison, Ill.

[22] Filed: Aug. 7, 1974

[21] Appl. No.: 495,507

[52] U.S. Cl. .......................... 250/231 SE; 210/233; 210/209; 340/347 P
[51] Int. Cl.² .......................................... G01D 5/34
[58] Field of Search ............... 250/231 SE, 233, 208, 250/209; 340/347 P, 271

[56] References Cited
UNITED STATES PATENTS

| | | | |
|---|---|---|---|
| 3,394,264 | 7/1968 | Busey | 250/233 |
| 3,487,400 | 12/1969 | Ludewig, Jr. et al. | 340/347 P |
| 3,725,665 | 4/1933 | Talmo | 250/231 SE |
| 3,787,121 | 1/1974 | Lowy et al. | 250/233 |
| 3,806,913 | 4/1974 | Kerhoas et al. | 250/231 SE |

*Primary Examiner*—Walter Stolwein
*Attorney, Agent, or Firm*—Andrus, Sceales, Starke & Sawall

[57] ABSTRACT

A motion monitor apparatus includes a monitoring housing with a projecting encoder shaft having an encoding disc on the inner end. The outer peripheral portion of the disc is imprinted with equicircumferentially distributed opaque sections. A pair of photo detectors are mounted with U-shaped arms having a light emitting diode to one side of the disc and a phototransistor to the opposite side. A signal processing circuit within the housing includes a pair of channels. Each channel includes a dual input gate connected to a resettable monostable multivibrator having a pulse width resistor-capacitor network have a variable resistor to adjust the output pulse width. The monostables have inhibit inputs and the outputs interconnected for various response conditions including dual directional response, single direction response or indicated opposite direction response. The processed pulse signals are impressed on an integrating capacitor which is coupled to drive a transistor. When the capacitor is charged, the transistor turns on to discharge the capacitor and actuate an indicator. The setting of the variable width pulse determines the speed required to actuate the indicator.

16 Claims, 6 Drawing Figures

MOTION RESPONSIVE DETECTOR APPARATUS

BACKGROUND OF THE INVENTION

The present invention relates to a motion detection apparatus and particularly to such apparatus having a sensitivity control to control the response to motion.

In many industrial controls and applications the presence and amplitude of selected motion as well as direction is detected and displayed or otherwise employed in a control to maintain a predetermined characteristic. Although such systems have been suggested, they have generally been designed with a separate sensor or pick-up connected at a remote location to the processing circuitry. Motion detectors are commonly employed in connection with industrial machines such as metal working presses, cutting tools, conveying apparatus and the like, where the rotational speed of a shaft of a machine is monitored to indicate abnormal operating conditions. For example, in the case of a metal working press, if the machine should become jammed, preventing press operation, some safety device should be incorporated to rapidly terminate machine operation to prevent damage to the apparatus or to the personnel operating the apparatus. A motion detector coupled to the drive shaft which can accurately determine shaft rotation and function as a zero or low speed detector may provide a suitable signal for operation of a simple safety interlock. In other systems, it may be desirable to limit the speed to a maximum rotational speed and provide an indication of an overspeed condition and/or operate a safety interlock or speed reducing control means. Rotary motion sensing is thus highly desirable to produce an interrelated indication and/or control means. In order to adapt a motion speed detector to the various applications and conditions encountered, however, requires that the apparatus includes means to effectively adjust the control to the particular limitations. In many applications, a mechanical motion may be conveniently transformed into an electrical output which is subsequently processed. The transformation is effected by a suitable transducer and may conveniently be a digital encoder which develops a train of electrical pulses in accordance with the amplitude or amount of motion of an element. Various encoders such as mechanical, magnetic and photoelectric types have been employed. Photoelectric encoders provide a highly satisfactory means from a practical standpoint. They have generally employed special infrared light system or conventional incandescent lamps which are not particularly adapted to a compact unit which can be machine mounted.

Generally in the prior art system, motion detector apparatus has normally employed a local pick-up unit connected to a remotely located signal processing unit by low voltage wiring. Such a system is subject to inducement of noise signals and the like on the low voltage wiring with the resulting possible false reading.

Although certain machine mounted systems have been suggested, electronically processed signal systems have generally not been satisfactorily employed because of the effects of vibration. Thus, as the motion approaches or reaches a stop or very slow state, slight vibration of the machine and/or shaft system can result in false driving of the output circuit or system. For example, U.S. Pat. No. 2,685,082 to Beaman et al discloses an incandescent lamp and optical pick-up system with a pair of offset sensors. If the unit is vibrated with the lamps immediately adjacent to a signal generating area of the disc 21, false digital output signals can be generated as a result of such vibrational movement and drive the counter. A more recent U.S. Pat. No. 3,449,588 discloses a photoelectric encoder employing a pair of relatively rotating graded disc members for producing four interrelated signals driving a logic circuit to determine the magnitude and direction of relative movement. The system employs a count channel and a separate direction channel to selectively enable the count channel having a pair of outputs selectively enabled by the separate directional control channel.

The electronic systems have not been developed, however, as an integrated machine mounted unit which can be readily adjusted to various responses and environmental and machine environments.

SUMMARY OF THE PRESENT INVENTION

The present invention is particularly directed to a motion detection apparatus adapted to industrial application and particularly including an integrated self-contained rotary sensor and signal processing unit for direct mounting upon the monitored apparatus. Generally, in accordance with the present invention, an incremental encoder including a rotary pick-up member is provided having an input encoder shaft rotatably mounted upon a mounting unit. The shaft includes a coupling means driven in accordance with the speed of the monitored motion. The encoder generates a train of pulse signals, which are fed to signal processing circuit board means secured to the mounting unit and connected to operate an output power switching means also secured to the mounting unit. The circuit board means includes a pulse forming network to generate a related train of pulses. The pulse forming network, in accordance with the teaching of the present invention, includes a control means for varying the width of the individual pulses of the output pulse train and the output is connected to the summing means to generate an analog signal proportional to the pulse signals received. By selecting the width of the output pulse, the sensitivity of the unit is controlled in a very simple and reliable manner to permit detection of essentially any significant speed of the shaft. As a practical construction, a single unit can be constructed for direct machine mounting to detect motion between levels as low as five revolutions per minute (rpm) and higher than 3600 rpm. In accordance with another aspect of this invention, a pair of pick-up units interconnected through a pair of interlocking channels provide means to detect direction of rotation as well as the speed of rotation.

In accordance with a particularly novel aspect of the invention, the encoder includes a housing within which the encoder shaft is rotatably mounted. A rotating encoder transparent disc is mounted on the shaft with the outer peripheral portion of the disc imprinted with equicircumferentially distributed opaque sections. A sensor unit is mounted adjacent the periphery and includes a generally U-shaped arm portion telescoped over the peripheral portion of the disc. The sensor arms support a light emitting diode to one side of the disc and a phototransistor or other similar light sensitive element to the opposite side. The phototransistor is connected to a solid state signal processing circuit mounted within the housing to respond to the rotation of the encoder disc. The signal processing circuit includes a pair of channels selectively interconnected in accordance with the rotary motion to be detected.

Each channel includes a triggered circuit such as a monostable multivibrator having a width control resistor-capacitor network with at least one channel having a variable resistor to adjust the output pulse switch. A duel input logic gate means is provided to permit selective interlocking connection of the channels for various response conditions. The processed pulse signals are impressed on the digital to analog converting network such as an integrating capacitor which is coupled to drive a transistor or other solid state switch means. When the capacitor reaches a selected voltage level, the transistor turns on, discharging the capacitor through the base circuit and actuating a suitable indication means or the like. A leakage or other suitable discharge path is coupled to the capacitor to provide a timed discharge of the analog signal such that the pulse signals must be received at a predetermined rate in order to actuate the indicator means. By establishing the variable width pulse at a maximum width, the system may actuate the indicator means in response to essentially a single encoder pulse and thereby indicating any significant motion. Conversely by minimizing the pulse width, the number of pulses which are transmitted must reach a predetermined level in order to charge the capacitor sufficiently to fire the switch means.

In accordance with another aspect of the present invention, the system includes suitably integrated circuits including a regulated direct current supply for energizing of the photoelectric encoder means and the signal processing circuits and a half-wave rectifier power circuit.

The usual channel circuitry permits connection to a single pick-up unit for producing speed detection independent of direction and connection to a pair of pick-up units for producing speed detection dependent upon direction. In the latter system, a switch means may be provided to preset the unit for response only in the presence of rotation of a selected one of the two directions.

In a bidirectional detection system, a pair of sensor units are mounted in spaced relation to each other adjacent to the encoding disc and offset slightly such that the signals generated from the two motions of the detectors are out-of-phase. The dual input logic gate means of the channels have one input held at standby level while the opposite logic gate input is connected to one sensor unit. The monostable multivibrator circuit includes inhibit inputs connected to the "not" output of the monostable multivibrator of the opposite channel. In this manner the first monostable multivibrator which is triggered not only generates the initiation of a variable pulse width signal but further simultaneously disables the other channel so as not to respond to the output of its encoder. The system directly interlocks the two channels to enable the one channel while disabling the opposite channel without the necessity for a plurality of separate control channels. In this mode, essentially two completely independent and separate channels operate suitable individual analog output devices directly in accordance with the output of the respective channels.

In a second selective directional response mode, the gate means of the two channels has the first corresponding inputs selectively connected to the outputs of the pair of sensor units, one of which generates an enable signal and the second of which generates a trigger signal. The monostable multivibrators or similar units are interconnected with a single drive channel connected to an output indicating or control means and the opposite channel coupled to control the functioning of the single channel. As a result only one direction of rotation, depending upon the position of the switching means, is operable to provide an output on the single drive channel.

In a third mode, a single sensor unit is connected to the one channel and connected to drive the second channel to produce a train of pulses of a preset width. The system is then responsive to both directions of rotation.

The present invention provides a relatively low cost motion monitor which can be applied as an integrated machine mounted electronic assembly applicable in various industrial and institutional applications.

BRIEF DESCRIPTION OF THE DRAWINGS

The drawings furnished herewith illustrate a preferred construction of the present invention in which the above advantages and features are clearly disclosed as well as others which will be readily understood from the following description of such illustrated embodiments.

In the drawings.

DESCRIPTION OF THE ILLUSTRATED EMBODIMENT

Figure 1:
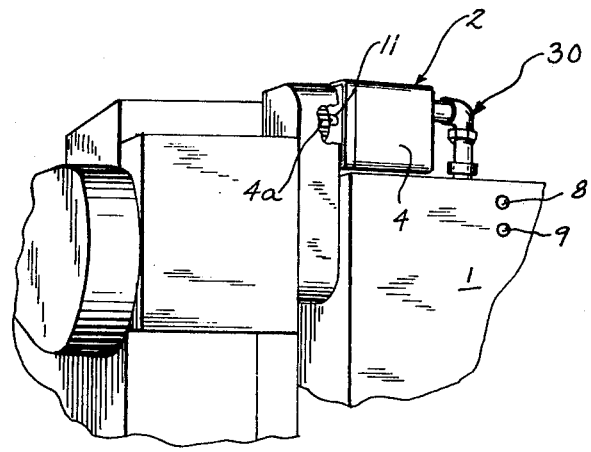
FIG. 1 is a side elevational view of a motion detector apparatus constructed in accordance with the present invention and mounted directly on a machine apparatus.
Figure 2:
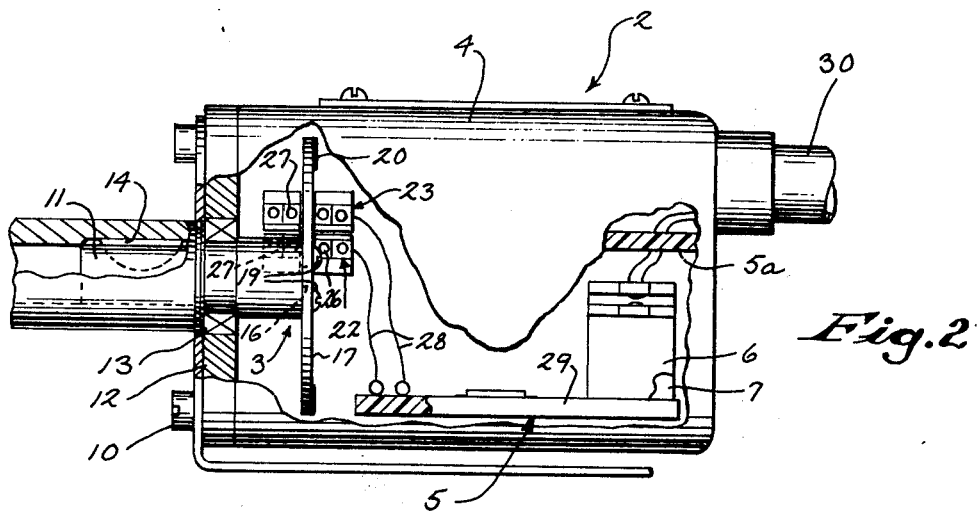
FIG. 2 is an enlarged fragmentary view of the detector apparatus with parts broken away to more clearly illustrate certain details of construction.
Figure 3:
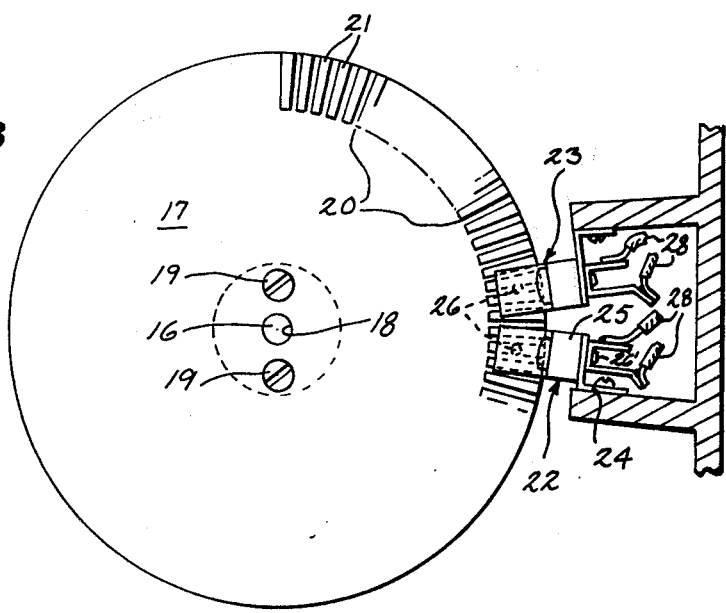
FIG. 3 is a vertical section taken generally on line 3—3 of FIG. 1 and illustrating an encoder disc unit.

Referring to the drawings and particularly to FIGS. 1 and 2, a machine 1, such as a press, is diagrammatically illustrated with a speed monitor unit 2 which is constructed in accordance with the present invention mounted directly on the machine 1. The speed monitor unit 2 generally includes a photoelectric encoder 3 mounted within a housing 4 to generate a pulse output in accordance with the rotation of a machine driven shaft 4a. A processing circuit subassembly 5 is mounted within the housing 4 and coupled to the output of the encoder 3 to directly provide an electrical output signal at a terminal block 5a in accordance with the rotational speed of the machine 1. The output of the illustrated processing circuit subassembly 5 includes a pair of directional responsive relay units 6 and 7, the outputs of which may be suitably connected to power any suitable indicating means, and for purposes of illustration diagrammatically shown as a pair of lamps 8 and 9. Relays 6 and 7 may be of any suitable construction and are preferably small Form C relays having two sets of isolated, normally closed contacts 6-1, 6-2, and 7-1, 7-2. In accordance with a particularly important aspect of the present invention, a sensitivity or set point control element 10 is provided to permit convenient direct adjustment of the response of the machine shaft operation and thereby preset the response of the indicating lamps 8 and 9.

The lamps 8 and 9 may be replaced with other indicating means or a feedback control means to provide a closed loop system. Thus, for example, if the invention is applied to a metal working press or the like where it is desired to provide a safety interlock in the prevention of jamming, the relays or other power switching means could be set to provide a zero speed detector and interconnected to terminate machine operation or even reverse the operation machine motion to prevent severe machine damage such as may otherwise occur. In a zero speed detection mode, the sensitivity control is selected to create a minimal motion rejection to thereby prevent operation as a result of input shaft vibration and/or other slight movement.

More particularly, the photoelectric encoder 3 includes a coupling shaft 11 rotatably mounted within the one end wall 12 of the housing 4 by a suitable long life bearing unit 13. The projecting exterior shaft portion is provided with a key-way 14 and suitably stepped to permit coupling to a drive shaft coupling member 15. The shaft 11 projects into the housing 4 and is provided with a flat inner face having a central locating projection 16. An encoder disc 17 is secured to the flat face of the inner end of the coupling shaft 11 and is further provided with a centrally accurately located alignment opening 18 mating with projection 16. A pair of central clamping openings through which clamping bolts 19 pass clamp the encoder disc 17 firmly to the end of the coupling shaft 11. The encoder disc 17 is a flat plastic plate which freely transmits the light. The radially outer portion of the disc 17 is especially imprinted with an equicircumferentially spaced opaque radial section 20 which defines alternate or intermediate light transmitting sections 21. The encoder disc 17 cooperates with a pair of photoelectric sensors 22 and 23 mounted in adjacent relationship within the housing 4.

Each of the units 22 and 23 is similarly constructed and the sensor 22 is described in detail. The illustrated sensor 22 includes a mounting frame 24 to which an optic coupler housing 25 is rigidly secured as by rivets 26. The coupler housing 25 includes a pair of oppositely located housing arms, one of which houses a light emitting diode 26 or other similar low voltage low current light source. The opposite arm of the coupler housing 25 houses a phototransistor 27 or the like which readily responds to the output of the light emitting diode 26. Necessary leads 28 project outwardly from the back of the housing portion for selective interconnection into a signal processing circuit board 29 of subassembly 5 located within the housing 4.

The second sensor unit 23 is similarly constructed and is mounted in circumferentially spaced relation immediately adjacent to the first sensor unit 22 in the illustrated embodiment of the invention of FIGS. 1 – 4. Unit 22 is angularly offset or tilted slightly with respect to the first unit to locate its LED and transistor elements offset relative to the opaque and light transmitting units and thereby produce an offset in the pulse trains such that the individual pulses overlap but have spaced leading and trailing edges, as subsequently discussed. The output of the two couplers or sensor units 22 and 23 are individually connected to similar signal processing channels provided on the signal processing circuit board 29 within the housing 4 to individually provide outputs the the respective switching relays. Thus, the circuit board 29 supports the signal processing and relay driver components, as diagrammatically illustrated with a connecting cable connector 30 providing the input-output connections as hereinafter described in connection with a preferred circuitry.

As illustrated the total package is a relatively small, compact unit which can be readily and conveniently installed upon a machine for monitoring or controlling its operation. For example, in a commercial construction, the dimensions of the housing were approximately 4 by 5 by 6 inches.

Figure 4:
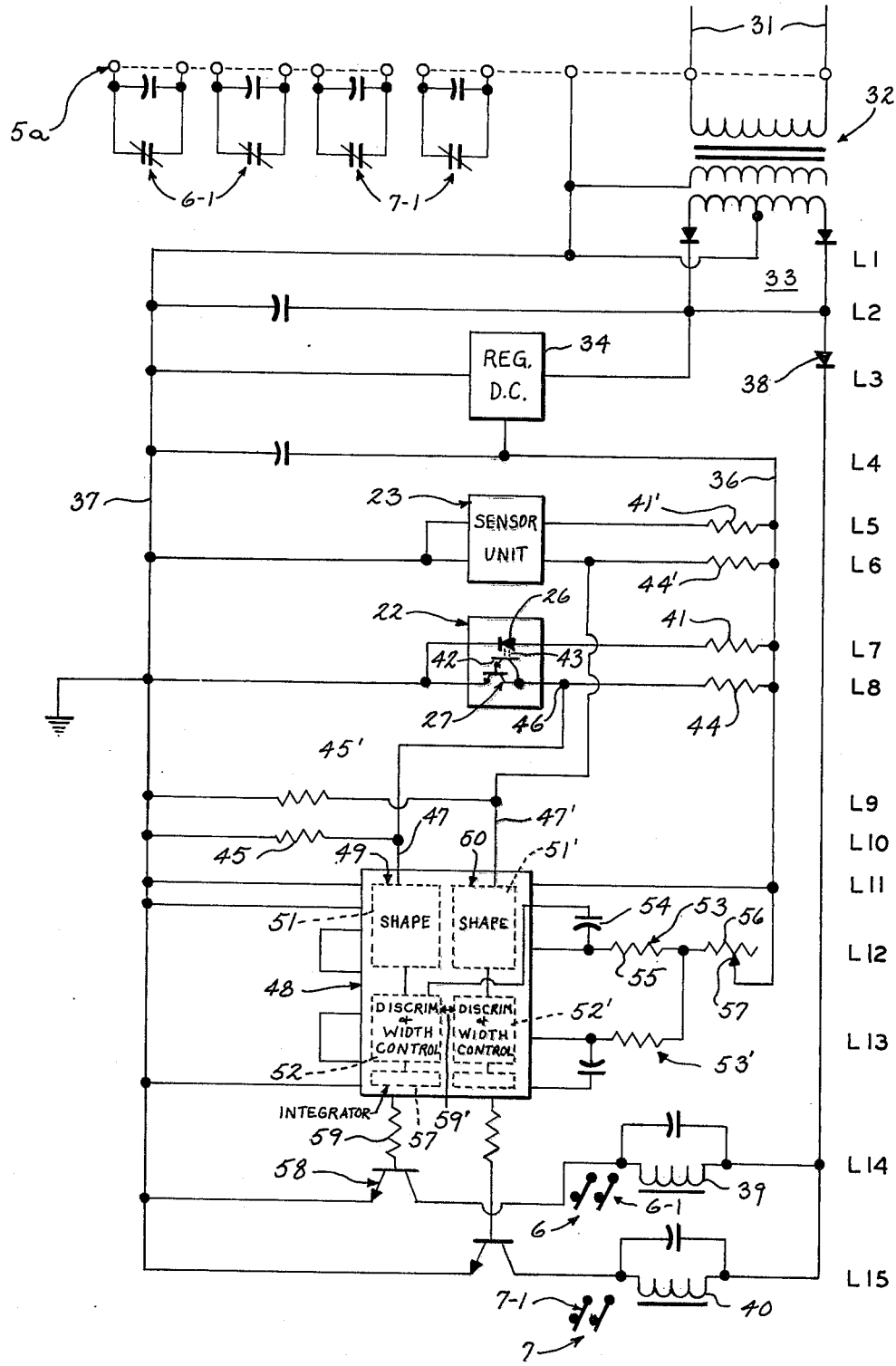
FIG. 4 is a schematic circuit illustration with integrated circuits shown in block diagram to show a preferred signal generating and processing system driven from the output of the photoelectric encoder shown in FIGS. 1 and 2.

Referring particularly to FIG. 4, a schematic circuit illustration of a preferred circuit for the present invention is given in which directional response to motion is provided. The illustrated circuit is shown in an across-the-line diagram with the several individual lines connected to the vertically illustrated power lines separately numbered by the identifying numbers L-1 through L-15, inclusive, for simplicity of explanation.

In FIG. 4, the connecting cable unit 30 is shown having a main set of A.C. power lines 31 connected to terminal board 5 a and supplying input power to a power input transformer 32 is provided within housing 4. Transformer 32 is connected through a full wave diode rectifier 33 to an integrated temperature stabilized regulated D.C. supply unit 34 in line L-3 in parallel with a filtering capacitor 35 in line L-2 to provide a regulated D.C. supply across a pair of D.C. signal lines 36 and 37, one of which is a common ground. The output of the transformer 32 is also center tapped and one-half of the output is also connected through a half-way rectifying diode 38 to supply power to a set of parallel relay windings 39 and 40 of the direction of responsive relays 6 and 7. The relay windings 39 and 40 are selectively controlled in response to the outputs of the sensor unit 22 and 23, which are similarly connected in the circuit as shown at lines L-5 - L-8. The structure and connection of the sensor unit 22 is shown schematically and described in detail.

The light emitting diode 26 is diagrammatically illustrated at line L-7 with the anode connected in series with a current limiting resistor 41 to the positive D.C. power supply line 36 of the power supply. The phototransistor 27 is connected in line L-8 and is shown as a well-known conventional dual transistor unit having the base of a transistor 42 selectively coupled to the light 43 from the light emitting diode 26. The conductivity of the phototransistor 27 is directly proportional to the light level impinging upon transistor 42. The output circuit of the phototransistor 42 is connected in series with a collector resistor 42 is connected in series with a collector resistor 44 to the positive voltage supply line 36 and directly to the ground line 37. A ground-return resistor 45 is connected in parallel with the phototransistor 27 between ground line 37 and the common junction or node 46 of the phototransistor 27 and the resistor 44. An encoder output signal line 47 is also connected to the common node 46 and to the input of a pulse signal processing unit 48.

When an opaque section 20 is aligned with the light emitting diode 26, the phototransistor 27 is turned off and the voltage at the signal line 47 rises to the level determined by the voltage division of the collector resistor 44 and the load resistor 45. When the encoding disc 17 moves a transparent section 21 between the light emitting diode 26 and phototransistor 27, the transistor conductivity increases and the potential of the common node 46 approaches essentially the ground potential or zero volts. The disc rotation therefor moves successive opaque and light transmitting sections 20 and 21 past diode 26 and essentially sine wave pulse signals are generated at the signal line 47. The signal lines 47 and 47' are connected to the signal processing circuitry which is shown in FIG. 4 in block diagram as a single integrated circuit chip 48. Generally, the chip 48 includes a pair of signal processing channels 49 and 50 each of which is similarly constructed as more fully diagrammatically illustrated in FIG. 5. Generally, the chip 48 includes a pulse forming or shaping circuit unit 51 and a pulse width control section 52 having an adjustable circuit means 53 to vary the output pulse width. The illustrated pulse width control means 53 includes a capacitor 54 connected across the inputs to the pulse width control of the related channel 49. A coupling resistor 55 is connected in series with a common preset potentiometer 56 to the positive side or line 36 of the D.C. power supply. The potentiometer 56 includes a tap 56a coupled to control element 10 and the setting of the potentiometer 56 controls the width of the shaped pulse signal.

The pulse output of the channel 49 is coupled to a digital-to-analog conversion unit 57 shown as an integrator output which is connected to a power transistor 58 connected in series with relay winding 39 of relay 6. Transistor 58 is shown as a well-known NPN type with the base connected to the output of the integrator 57 in series with a base resistor 59.

The integrator 57 integrates the successive pulses from the channel 49 and drives the transistor 58 on at a selected output and then resets. By proper selection of the pulse width control the speed of rotation required of the machine shaft 11 and therefore the machine shaft 4a to activate the corresponding transistor 58 is controlled.

Conduction of transistor 58 provides power to relay winding 39 of relay 6 for operation of the associated illustrated contacts 6-1 and 6-2. Theoretically, the system can be made sensitive to a single large width signal to energize the corresponding relay. In actual practice, the system is designed to require a minimum number of pulses related to a few revolutions of the main shaft 5a. The number of pulses which must be received, however, are directly controlled by the sensitivity setting of the variable potentiometer 56 which, in turn, controls the various pulse signals generated. If relatively wide pulse signals are generated for each input pulse signal, a relatively small number of pulse signals will increase the output of the converter or integrator 57 to the triggering level. Conversely, if the pulse width signals are made of a minimal width, a relatively large number of such pulse signals must be received within a unit time to actuate the transistor 58.

The potentiometer 56 provides accurate pulse width control and thus provides a convenient, simple and reliable means of controlling the output in accordance with the motion of the shaft.

Figure 5:
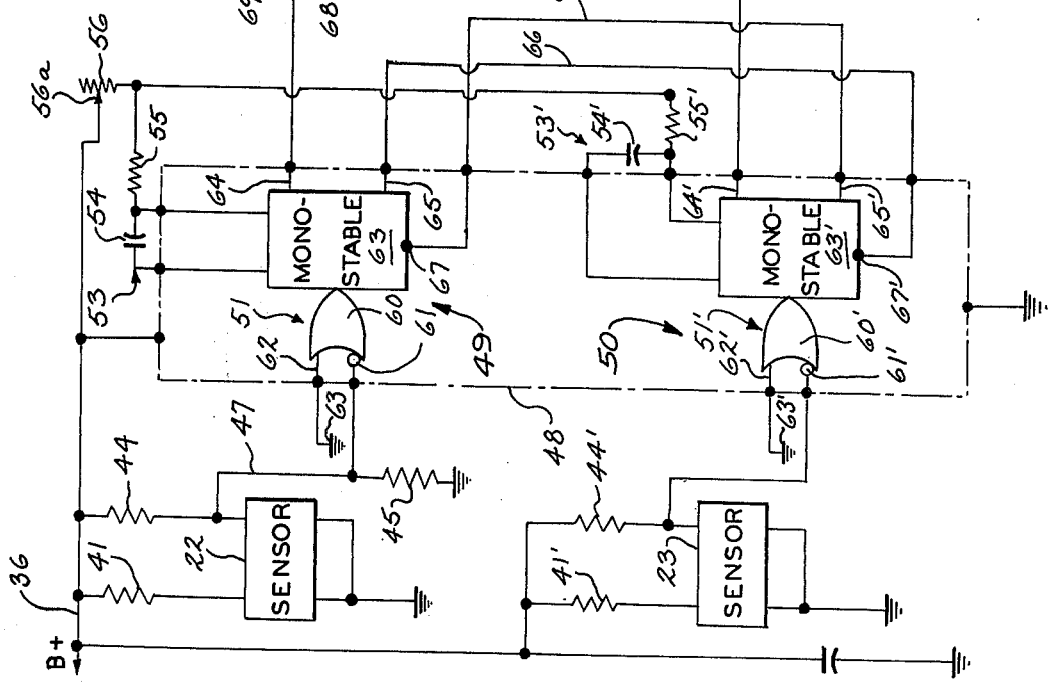
FIG. 5 is a simplified schematic illustration of the block diagram illustration in FIG. 4.

The channel 50 for the second sensor 23 is similarly constructed and provided with a similar network 53' connected in series with the single adjustable pulse width potentiometer 56 to provide a corresponding pulse width setting. In the embodiment of FIGS. 4 and 5, the channels 49 and 50 are interlocked as shown by coupling line 59 in FIG. 4 such that the pulse trains activate one and inactivate the other of the two channels 49 and 50 in accordance with the direction of rotation. Thus, each of the channels 49 and 50 receives an input pulse for rotation of the disc 17 which moves opaque and light transmitting sections past the two sensor units 22 and 23. The output signals are, however, offset slightly in accordance with the offset of the two units 22 and 23 to produce a time and phase difference in the timing of the signals. The phase difference is coupled through the interlock signal line 59 to inhibit the operation of the opposite channel. Thus, one unit 22 and 23 produce a leading signal depending upon the direction of rotation. The leading signal activates its channel and deactivates the opposite. A preferred circuit is more fully disclosed in FIG. 5, wherein the main portions of the integrated circuit chip 48 are shown in simplified schematic illustration for purposes of more clearly illustrating the preferred construction of the present invention. The channel 49 is described in detail with the corresponding elements of channel 50 which are generally identified by primed numbers. In FIG. 5, the chip unit 48 is illustrated in block outline with edge terminals for connecting of the several circuit systems shown. Thus, they may be a suitable integrated circuit such as a dual channel, retriggerable monostable multivibrator manufactured and sold by Motorola under the Number MC8602 and disclosed in their specification sheet therefor under copyright by Motorola, Inc., under data of 1971.

Referring particularly to FIG. 5, the output of the sensor unit 22 is coupled to the input of the pulse forming circuitry in which the pulse shaper 51 is shown as a dual input logic OR gate 60 having an inverting input 61 connected to signal line 47. The dual input OR gate is a suitable level responsive circuit such as a "Schmitt" circuit which will produce an output pulse having an essentially rectangular configuration. Thus, when the more or less sine wave pulse signal of the sensor 22 raises the trigger level the gate 61 conducts. In the embodiment of FIG. 5, the second input 62 of gate 51 is coupled to ground or logic "0" as shown by symbol 63 and thus is not functionally employed. The pulse signals from sensor 22 vary between a positive signal level and ground as the photosensitive transistor 27 is aligned with an opaque section 20 and then with a transparent section 21. The inverting input 61 causing the logic unit to trigger on the trailing edge of the pulse signal generated by the opaque section 21 as the voltage decreases to ground level. The output of the gate 61 is connected to trigger or fire a monostable multivibrator or one shot circuit 63 to which the control network 53 is connected. Circuit 63 has a positive output 64 connected directly to the integrator circuit 56 and a "Not" output 65 connected via an interlock lead 66 of interlock bus 59 of FIG. 4 to an inhibit input 67' of the opposite monostable multivibrator 63'. As more fully disclosed in the Motorola specification sheet, the duration and accuracy of the complementary output pulses at the positive output 64 in the Not output 65 are determined by the connection of external timing capacitor 54 and the resistance of resistor 53 and 56. More particularly, each time the gate 60 provides an operating input pulse to the monostable multivibrator 63' a discharge circuit for the capacitor 54 is established which rapidly discharges and initiates new output pulses of outputs 64 and 65. The output 64 goes to a high or positive voltage state during the period that the capacitor 54 discharges and remains in the high state until such time as the capacitor is fully charged. The resistance level of the series resistors 55 and 56 determines the charging time. Each input pulse discharges the capacitor 54, whether or not it has timed out, and initiates a new timing cycle. The output of circuit 63 may, therefore, be maintained on to hold output 64 high if the input pulses are sufficiently rapid or alternatively a series of interrelated output pulses, each of which has a preset width, in accordance with the setting of the resistance of potentiometer 56, is created.

The Not output of the monostable multivibrator 65 simultaneously and for a corresponding period is held at a logic 0. The connection thereof to the inhibit input 67' of the opposite monostable multivibrator 63' positively inhibits the firing or retriggering of the latter in response to the leading edge of the negative going pulse. The slight offsetting of the two sensor signals thereby positively provides a corresponding phase difference between the two output signals. The one gate 60 or 60' is fired before the other depending upon the direction of rotation and the response of the circuit is such that a positive interlock is established to maintain transmission only from the corresponding first activated channel 49 or 50.

The output of each channel 49 and 50 is similarly connected to its integrating unit 56. In the illustrated embodiment of FIG. 5, the unit 56 is shown is very simplified form including a capacitor 68 connected in series with a coupling diode 69 to the output 64' of channel 49. The capacitor 68 is also connected across the input of a switching transistor 57 in series with the base resistor 58. The variable width pulse train charges the capacitor 68 and at a corresponding rate. The capacitor 68 discharges between pulses as a result of transistor leakage currents or, if desired, a parallel, positive discharge circuit may be provided. If a relatively wide width pulse is set, separarated by relatively narrow quiet periods, the capacitor 68 will rapidly charge to a level sufficient to forward bias the transistor 57 and thereby produce an output signal which is coupled through the coupling resistor to the power transistor to thereby energize a corresponding relay. Inversely, if the pulse width is very narrow, the speed of the shaft must be significantly greater in order to properly charge the capacitor 68 to a level necessary to turn on the transistor 57 and thereby energize the corresponding relay winding 39 of relay 6 to open the illustrated normally closed contacts 6-1 and 6-2. Thus by the means of adjusting the external potentiometer 56, the operator can readily set the sensitivity of the motion detector to accurately detect the desired motion. The sensitivity is readily adjustable as a practical matter in a range of from five to 60 rpm and will operate readily up to and above 3600 rpm.

In the illustrated embodiment of FIG. 4 the direction of rotation is automatically indicated. As the result of the similar construction of the channel 50 and the interlock connection lines 66 and 66', the timing is similarly set through the similar connection of the single potentiometer 56 to both networks 53 and 53' of channels 49 and 50.

Thus, clockwise rotation results in the sensor 22 first establishing a trigger pulse edge to activate the gate 60 of channel 49. This immediately sets the monostable unit 63, with the Not output 65 dropping to a logic 0. the Not output 65 is coupled to the inhibit input 67' and operatively disables the monostable unit 63' of channel 49 such that it will not respond to the trigger pulse edge of the pulse from sensor 23.

Conversely, opposite rotation results in the trigger edge of the pulses from sensor 23 leading that of pulses from sensor 22. Monostable unit 63' is, therefore, set to produce an inhibit signal at its Not output 65' which is fired to inhibit input 67 of channel 49. Therefore, channel 49 is operatively disabled and channel 50 operates to energize lamp 9 in accordance with the setting of the common potentiometer. The self-contained and enclosed unit including both the sensing means, as well as the digital and analog circuitry, permits the adoption of the motion detector to the many various machine applications encountered in industrial environments with reliable detection of the motion. The sensitivity control permit setting of the response to any desired level and further permits adjustment to reject input shaft vibration and other slight movement related motion. Generally, when the input speed may vary slightly, the sensitivity is set to a lowest shaft speed response.

Figure 6:
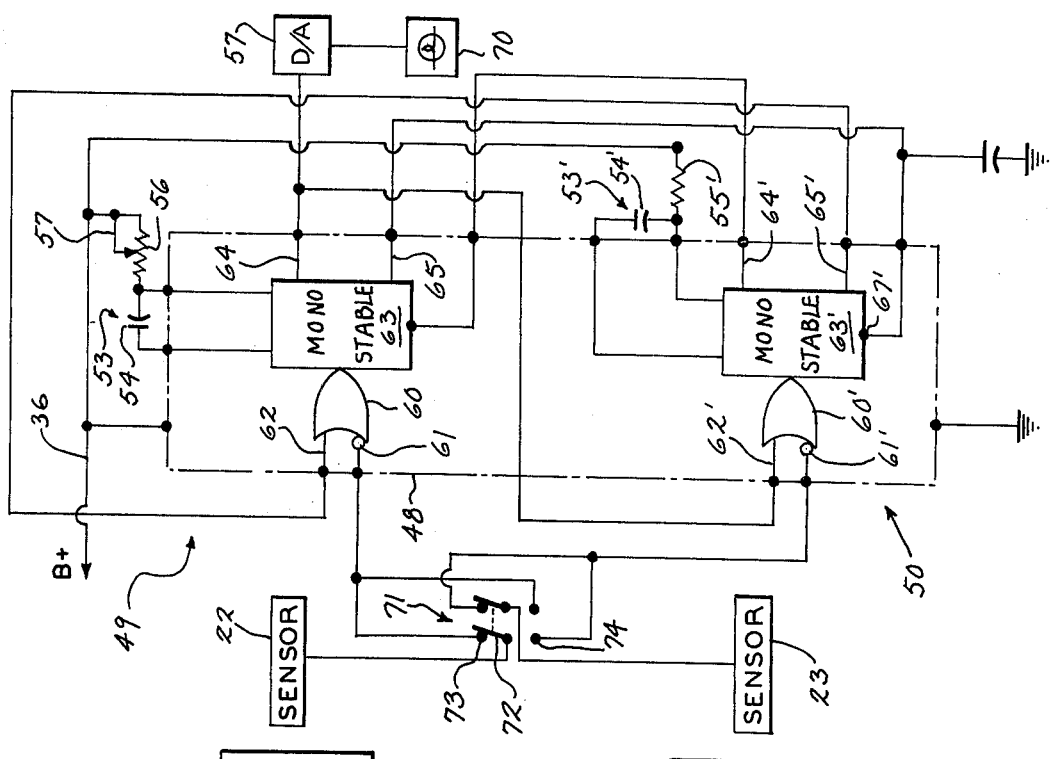
FIG. 6 is a simplified circuit similar to FIG. 5 showing an alternative embodiment employing a manual direction response selection control.

The basic self-contained unit is further adapted to selective detection of rotation in only one direction which may be selectively controlled through provision of a suitable switch means. For example, in FIG. 6, a dual channel circuit similar to that shown in FIG. 5 illustrated employing a single output relay 70 selectively responsive to the forward or a reverse rotation, depending upon the setting of a switch means 71. The components are essentially the same as the previous embodiment and corresponding elements are similarly numbered for simplicity of explanation. Thus, the integrated circuit unit 48 is coupled or connected by the switch means 71, in the manner previously described to a pair of similar sensors 22 and 23. The sensors 22 and 23 are located with respect to the disc 17 such that the outputs provide a high or logic "1" output simultaneously but are offset slightly to provide an enable signal and a trigger signal in sequence to the two channels 49 and 50 of the integrated circuit unit 48. The switch means 71 is illustrated as a suitable reversing switch and particularly as a double-pole, double-throw switch means which selectively reverses the output connection lines 47 and 47' from the sensors 22 and 23 to the input gates 60 and 61' of the two processing channels. The channel 49 is illustrated as the driving channel connected to the integrating unit 56 for appropriate energizing of the relay 70. The opposite channel 50 is then connected as the enabling channel with its output coupled to control or enable the driving channel 49. The channel 50 must, therefore, be first activated to enable the driving channel 49 or the rotation motion is rejected by the detection apparatus.

The switch 71 is illustrated as a double-pole, double-throw switch unit having a pair of movable poles 72 connected one each to the sensors 22 and 23 and selectively engaging a set of clockwise rotation contacts 73 and a set of counter-clockwise rotation contacts 74. Contacts 73 connect the sensor 22 to the enable channel 50 and sensor 23 to the driving channel 49 while contacts 74 reversely connect the sensor 22 to driving channel 49 and sensor 23 to the enable channel 50. Thus, under one direction of rotation the sensor 22 provides the leading or enable signal to the driving channel 49 to generate the desired output only in response to a clockwise rotation. Conversely with the switch 71 reversed, the sensor 23 produces the leading or enable signal coupled to the first channel 50 while the sensor 22 provides the lagging or trigger signal which is now coupled to the reverse driving channel 49, and thereby limiting response to counterclockwise rotation.

The driving channel 49 is provided with a variable width output to permit adjustment of the output response and thereby selection of predetermined speed detection. In the selective direction response mode of FIG. 6, the monostable unit 63' associated with the enable chanel 50 is formed with a fixed time constant network 53 by direct connection of resistor 54' to D.C. line 36 such that an output pulse signal of a constant width for each input signal from the connected sensor is formed. The channel 50 is set to provide a narrow, sharp pulse for accurate triggering of channel 49. The positive output 64' of channel 50 is connected directly back to the second input 62' of the logic OR gate 60'. The Not output 65' of channel 50 is connected to the inhibit input 67 of the drive channel 49 as well as to the second input 62 of the input logic gate 60 of the first or driving channel 49.

The Not output 63' of channel 50 is normally high and applied to inhibit input 67 of channel 49, holding the channel operatively disabled. Therefore channel 50 must be first activated to establish a low output at the Not output 65' which releases monostable unit 63 of channel 49 for operation. The second input 62 of gate 60 is similarly interlocked to the output 65'. If the enable channel 50 is not actuated its enabling output will not be present to enable the trigger channel 49. The enable channel 50 is first actuated in response to one direction of rotation in accordance with the setting of the switch 71. With the alternate settings of the switch 71, only the related direction of rotation provides the proper sequential triggering of the two channels 49 and 50 to drive the output channel 49 whereas the opposite rotation is rejected as a result of the creation of the trigger or count signal prior to the enable signal. Thus, by the simple addition of the switch to the basic unit and the slight rewiring of the pulse width control means, the same basic circuit is readily constructed to provide selective direction of actuation and rejection of the opposite rotation.

The width of the monostable unit 63' of the enable channel 50 is preset for a predetermined time. As long as the enabled channel is activated prior to the trigger channel the trigger pulse will be transmitted and a variable width pulse signal.

The enable channel 50 has its inhibit input 67' connected to the positive supply line 36 thereby preventing the automatic retriggering feature.

As previously noted, the motion detector can also be constructed to provide response to either direction of rotation. This system can be provided by simple modification of the embodiment shown in FIG. 6. More particularly, the single encoder means 23 is connected as the triggering input to the enable channel 50, with channel 50 otherwise connected as in FIG. 6. Channel 49 is also connected as illustrated with the inverting input 61 connected directly to the positive bias line 36. Each pulse of the sensor 23 activates the enable channel 50. With gate input 61 coupled to line 36, the negative input pulse transmitted to the logic gate 60 drives the monostable unit 63 to produce a positive output pulse to drive the associated integrator 57, regardless of the direction of rotation. The output is not, therefore, sensitive to direction. The output pulse signals are of a presettable width to again actuate the indicating device or other control at any desired speed. The sensitivity of such a system is readily varied between five rpm and 1740 rpm and also readily operating above the 3600 rpm level.

Various modes of carrying out the invention are contemplated as being within the scope of the following claims, particularly pointing out and distinctly claiming the subject matter which is regarded as the invention.

1. A motion detector apparatus having sensing means for establishing a train of pulse signals in accordance with the motion being monitored, a signal processing system including a pair of logic signal channels at least one of which constitutes a load driver channel, said load driver channel including a pulse forming circuit connected to said sensing means and having an adjustable presettable speed selection means to vary the width of the output pulse signal of said load driver channel for each input, the second of such channels connected to said load driver channel to establish a conjoint control of the output of the load driver channel, a housing having a mounting means for mounting upon a driven apparatus having a rotating element, a shaft rotatably mounted in said one wall of said housing and having an outer shaft portion adapted to be directly coupled to the rotating element, said sensing means including a coding disc, the outer periphery of said disc being formed with alternate opaque and light transmitting equicircumferentially spaced radial sections, means firmly mounting said disc on the inner end of said shaft, a photodetector assembly mounted within said housing and including a pair of oppositely projecting arms defining a slot through which the radial sections of the encoding disc rotate, a light emitting diode being mounted in one of said arms and a phototransistor being mounted in the opposite of said arms in alignment with the output of the light emitting diode whereby the conductivity of the phototransistor is alternately increased and decreased in accordance with the rotation of the encoding disc, and means mounting said signal processing circuit means within said housing.

2. The motion detector apparatus of claim 1 wherein said sensing means includes a pair of photodetector assemblies one of which constitutes a direction enable pulse detection source and the other of which constitutes a motion detection count source, said channels being interconnected whereby one of said channels responds to the enable detection source to enable the opposite channel, the opposite channel being connected to respond to the motion detection source to provide a variable width output signal only during the momentarily enabling of the opposite channel.

3. The apparatus of claim 2 wherein a switch means selectively interconnects the output of the pair of detection sources to the control inputs of the opposite channels to provide for selection of the direction of response and the rejection of the opposite direction motion direction.

4. The apparatus of claim 2 wherein a single sensing means provides a pulse train responsive to either direction of motion, a pair of monostable multivibrators being interconnected whereby the output of the one monostable multivibrator having a variable width output is connected to produce a speed related output pulse, said monostable multivibrator having the one input connected reference and an opposite input connected to the output of said opposite monostable multivibrator, said opposite monostable multivibrator being connected to the sensing means.

5. A motion detector apparatus having sensing means for establishing a train of pulse signals in accordance with the motion being monitored, a signal processing system including a pair of logic signal channels at least one of which constitutes a load driver channel, said load driver channel including a pulse forming circuit connected to said sensing means and having an adjustable presettable speed selection means to vary the width of the output pulse signal of said load driver channel for each input, the second of such channels connected to said load driver channel to establish a conjoint control of the output of the load driver channel, each of said channels including a dual input Schmitt trigger circuit having an inverting input and a non-inverting input, a monostable multivibrator having an input connected to the output of said trigger circuit and having a positive output and a not output, said monostable multivibrator having a timing means to determine the width of the output pulse of the monostable multivibrator in response to each input, said monostable multivibrator having an inhibit reset input to prevent triggering of the monostable multivibrator and thereby establishing a single output pulse in response to an input pulse.

6. The motion detector of claim 5 having a signal integrating circuit having a signal integrating capacitor connected to the output of at least one of said monostable multivibrators to integrate the variable width pulse signals, a transistor connected in said integrating circuit and particularly across said integrating capacitor and responsive to a selected voltage on the capacitor to conduct and provide an output related to the total summed variable width pulse signals.

7. The monitoring apparatus of claim 5 wherein said sensing means includes a rotating disc having a peripheral portion with alternate light transmitting and opaque sections and a pair of circumferentially offset photodetector assemblies to provide a pair of offset pulse trains, each of said channels having a corresponding gate connected to a different one of the assemblies, each of said monostable multivibrators having its positive output connected to s separate summing circuit to provide a corresponding output, the not-outputs of the respective monostable multivibrators being connected to the inhibit input of the opposite monostable multivibrator to inhibit the corresponding monostable multivibrator and to thereby establish a single pulse train from the first activated monostable multivibrator to provide a directional control output, said summing circuit of the activated load channel providing a motion amplitude detection output.

8. A motion monitoring apparatus for selectively determining the motion of a rotating element comprising a housing having a mounting means for mounting upon a driven apparatus, a shaft rotatably mounted in said one wall of said housing and having an outer shaft portion adapted to be directly coupled to the monitored motion of the rotating elements, a rotating encoding means coupled to said shaft within said housing and establishing a pair of phase displaced pulse trains of a preselected number of pulses for each increment of shaft rotation, a solid state signal processing circuit mounted within said housing an including a pair of signal processing channels, each of said channels including a dual trigger input logic gate, a retriggerable monostable multivibrator having an input connected to the output of said logic gate and having a positive output and a not-output, said monostable multivibrator having an adjustable presettable timing means to determine the width of the output pulse of the monostable multivibrator in response to each input, said monostable multivibrator having an inhibit input to prevent retriggering of the monostable multivibrator and thereby establishing a single output pulse in response to an input pulse, and circuit means interconnected of the said channels to each other and to the encoding means to selectively provide an output responsive to the motion detected, and a pulse summing means connected to the output of one of said monostable multivibrators to produce an output related to the speed of the motion.

9. The apparatus of claim 8 wherein said encoding means includes a coding disc formed of the light transmitting plastic, means firmly mounting said disc on the inner end of said shaft, the outer periphery of said disc being formed with alternate opaque and light transmitting equicircumferentially spaced radial sections, a photodetector assembly mounted within said housing and including a pair of oppositely projecting arms defining a slot through which the radial sections of the encoding disc rotate, a light emitting diode being mounted in one of said arms and a phototransistor being mounted in the opposite of said arms in alignment with the output of the light emitting diode whereby the conductivity of the phototransistor is alternately increased and decreased in accordance with the rotation of the encoding disc.

10. The monitoring apparatus of claim 9 wherein said encoding means includes a pair of circumferentially offset detector assemblies to provide said pair of pulse trains, each of said channels having a corresponding gate connected to a different one of the encoding means.

11. The monitoring apparatus of claim 10 wherein each of said monostable multivibrators having its positive output connected to a separate summing circuit to provide a corresponding output, the not-outputs of the respective monostable multivibrators being connected to the inhibit input of the opposite monostable multivibrator to inhibit the corresponding monostable multivibrator and to thereby establish a single pulse train from the first activated monostable multivibrator to provide a directional control output, said summing circuit of the activated load channel providing a motion amplitude detection output.

12. The motion detector of claim 10 wherein one of said assemblies constitutes a direction enable pulse detection source and the other of which constitutes a motion detection count source, said channels being interconnected whereby one of said channels responds to the enable detection source to enable the opposite channel, the opposite channel being connected to respond to the motion detection source to provide a variable width output signal only during the momentarily enabling of the opposite channel.

13. The monitoring apparatus of claim 12 wherein a switch means selectively interconnects the output of the pair of detection means to the control inputs of the opposite channels to provide for selection of the direction of response and the rejection of the opposite direction motion direction.

14. The apparatus of claim 8 wherein said summing means includes a signal integrating circuit having a signal integrating capacitor connected to the output of at least one of said monostable multivibrators to integrate the variable width pulse signals, a transistor connected in said integrating circuit and particularly across said integrating capacitor and responsive to a selected voltage on the capacitor to conduct and provide an output related to the total summed variable width pulse signals.

15. A motion monitoring means for selectively determining the motion of a rotating element comprising a housing having a mounting means for mounting upon a driven apparatus, a shaft rotatably mounted in said one wall of said housing and having an outer shaft portion adapted to be directly coupled to the monitored motion of the rotating elements, a coding disc formed of the light transmitting plastic, means firmly mounting said disc on the inner end of said shaft, the outer periphery of said disc being formed with alternate opaque and light transmitting equicircumferentially spaced radial sections, a pair of photodetector assemblies mounted in circumferentially spaced relation within said housing and each including a pair of oppositely projecting arms defining a slot through which the radial sections of the encoding disc rotate, a light emitting diode being mounted in one of said arms and a phototransistor being mounted in the opposite of said arms in alignment with the output of the light emitting diode whereby the conductivity of the phototransistor is alternately increased and decreased in accordance with the rotation of the encoding discs, a solid state signal processing circuit mounted within said housing and including a pair of signal processing channels, each of said channels including a dual input Schmitt trigger circuit having an inverting input and a non-inverting input, a retriggerable monostable multivibrator having an input connected to the output of said trigger circuit and having a positive output and a not-output, each of said monostable multivibrators having an adjustable presettable timing means to determine the width of the output pulse of the monostable multivibrator having an inhibit input to prevent retriggering of the monostable multivibrator and thereby establishing a single output pulse in response to an input pulse, and circuit means interconnected of the said channels to each other and to the encoding means to selectively provide an output responsive to the motion detected, a signal integrating circuit having a signal integrating capacitor connected to the output of at least one of said monostable multivibrators to integrate the variable width pulse signals, a transistor connected in said integrating circuit and particularly across said integrating capacitor and responsive to a selected voltage on the capacitor to conduct and provide an output related to the total summed variable width pulse signals.

16. The monitoring apparatus of claim 15 wherein each of said monostable multivibrators having its positive output connected to a separate summing circuit to provide a corresponding output, the not-outputs of the respective monostable multivibrators being connected to the inhibit input of the opposite monostable multivibrator to inhibit the corresponding monostable multivibrator and to thereby establish a single pulse train from the first activated monostable multivibrator to provide a directional control output, said summing circuit of the activated load channel providing a motion amplitude detection output.

* * * * *

UNITED STATES PATENT AND TRADEMARK OFFICE
CERTIFICATE OF CORRECTION

PATENT NO. : 3,963,919
DATED : June 15, 1976
INVENTOR(S) : FRED E. SELLS

It is certified that error appears in the above—identified patent and that said Letters Patent are hereby corrected as shown below:

| | | | |
|---|---|---|---|
| Column 6, | Line, | 3, | after "outputs" cancel "the" and insert---to---; |
| Column 6, | Line, | 25, | after "board" cancel "5 a" and insert---5a---; |
| Column 6, | Line, | 54, | cancel "with a collector resistor 42 is connected in series" |
| Column 8, | Line, | 28, | after "under" cancel "data" and insert---date---; |
| Column 9, | Line, | 27, | after "shown" cancel "is" and insert---in---; |
| Column 9, | Line, | 66, | after "logic" cancel 0. and insert---"0".---; |
| Column 9, | Line, | 67, | before "Not" cancel "the" and insert---The---; |
| Column 10, | Line, | 25, | after "Fig. 5" insert---is---; |
| Column 13, CLAIM 7 | Line, | 46, | before "separate" cancel "s" and insert---a---; |
| Column 13, CLAIM 8 | Line, | 67, | after "housing" cancel "an" and insert---and---; |

Signed and Sealed this

Twelfth Day of October 1976

[SEAL]

Attest:

RUTH C. MASON
Attesting Officer

C. MARSHALL DANN
Commissioner of Patents and Trademarks